(Model.)

D. CARR.
DRAFT EQUALIZER.

No. 265,018. Patented Sept. 26, 1882.

WITNESSES:
Francis McArdle.
C. Sedgwick

INVENTOR:
D. Carr
BY Munn & Co
ATTORNEYS.

UNITED STATES PATENT OFFICE.

DALLAS CARR, OF CHANDLERVILLE, ILLINOIS.

DRAFT-EQUALIZER.

SPECIFICATION forming part of Letters Patent No. 265,018, dated September 26, 1882.

Application filed May 22, 1882. (Model.)

*To all whom it may concern:*

Be it known that I, DALLAS CARR, of Chandlerville, in the county of Cass and State of Illinois, have invented a new and useful Improvement in Draft-Equalizers for Sulky-Plows, of which the following is a full, clear, and exact description.

This invention relates to sulky-plows using four horses abreast, and in which, in order to equalize the draft consequent upon the necessary arrangement of each pair of horses at different distances from the plow-beam, levers of different lengths are connected on opposite sides of the plow-beam, with the draft devices for giving to the pair of horses which are nearest to the plow-beam the shortest working-leverage, and to the pair of horses which are farthest from the beam the longest leverage-connection with the latter, as in a previous invention of mine for which Letters Patent have been allowed me.

My invention in this relation consists in a novel combination of means whereby said draft-equalizing attachments are better adapted to sulky-plows of different constructions, and in which the pole or tongue of the plow is at variable distances from one side of the plow-beam, thereby causing one of the horses to be crowded against the pole or tongue. This my invention obviates without changing the position of the plow-beam.

It also consists in means whereby provision is made for moving the equalizing-levers back and forth without coming in contact with the wheels of the plow; also in means whereby an even or uneven pressure of the equalizing-levers on opposite sides of the beam may be obtained at pleasure of the operator, and whereby the plow may be made to take more or less land, as desired. Provision likewise is made for plowing at different depths without interfering with these several changes.

Reference is to be had to the accompanying drawings, forming part of this specification, in which similar letters of reference indicate corresponding parts in all the figures.

Figure 1:
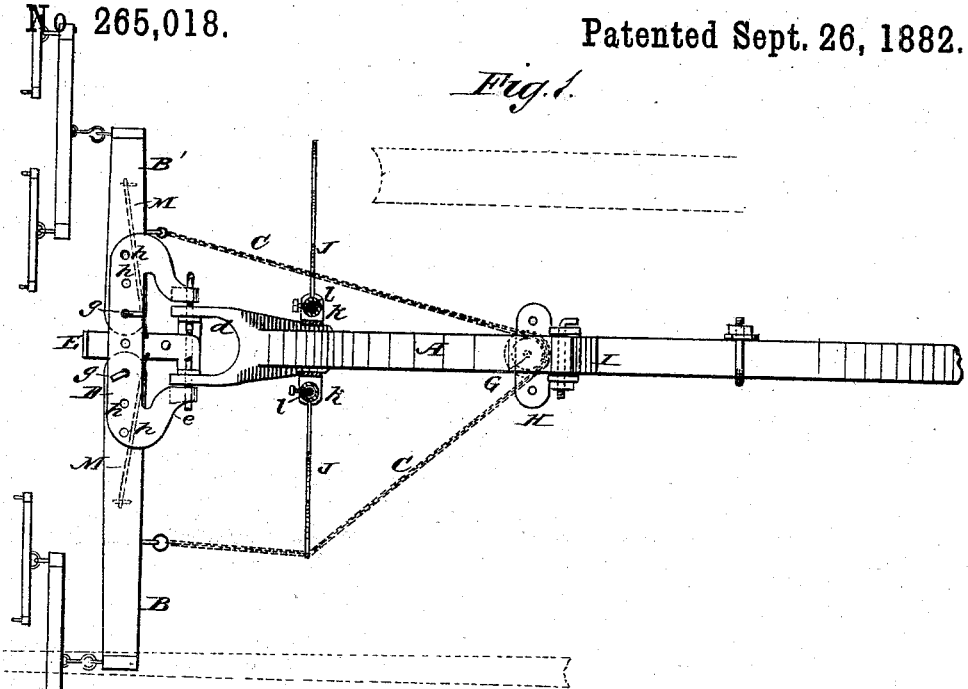
Figure 2:
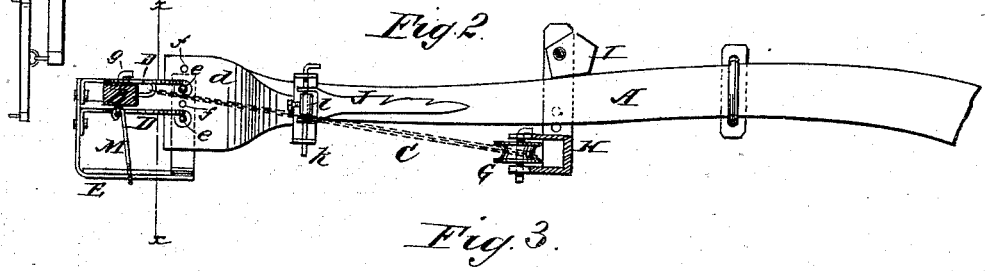
Figure 3:
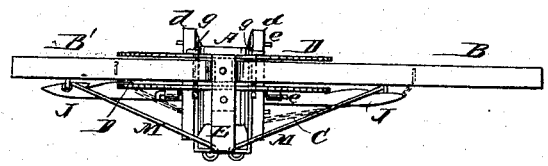
Figure 4:
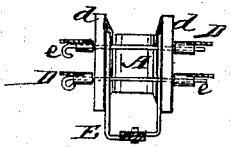

Figure 1 represents a plan of my improved draft-equalizing devices in connection with the plow-beam of a sulky-plow; Fig. 2, a partly-sectional side view of the same; Fig. 3, a front view thereof, and Fig. 4 a transverse section on the line $x\ x$ in Fig. 2.

A in the drawings indicates the plow-beam, and B B' the draft-equalizing levers, of unequal length on opposite sides of the beam, for each pair of horses to transmit its draft through, said levers being connected with the beam at different distances from their pivots or working-centers $g\ g$ by a chain, C, as hereinafter described.

In my present improvement the levers B B' are pivoted to and arranged to work at their fulcrum ends in between a pair of cross-jaws, D D, forming a double clevis which is connected in front by an arm, E, with the front jaw end, $d$, of the beam, said arm E passing either in an upward or downward direction within the upright jaw $d$ of the beam to make such connection. The cross-jaws D D are here shown as disconnected at their back ends, and as secured, in connection with the arm E, which carries them, by pins $e\ e$ passing through said jaws and arm, and through any two of a series of horizontally-arranged apertures, $f$, in and through the sides of the jaw $d$ of the plow-beam; but the cross-jaws D D may be connected at their back ends, so that one pin may be used for securing them in position and another pin be used to hold the arm E to the jaws. In either case provision is made for raising or lowering the cross-jaws D D in or relatively with the jaw end $d$ of the plow-beam for the purpose of altering the depth at which the plow should work. Furthermore, the draft-equalizing levers B B' have their fulcrum-pins $g\ g$ arranged to pass through a pair of a series of holes, $h$, in the cross-jaws D D, whereby said levers may be separately adjusted farther in or out laterally—that is, to the right or to the left—so as to cause the plow to take more or less land, as may be desired; or one of said levers may be shifted to the right and the other to the left, so as to cause the horses to walk wider apart without altering the running of the plow. This increased separation of the horses will be found desirable in hot weather.

The chain C is attached at its ends to the levers B B' at suitable distances from their fulcrums to equalize the draft. Said chain C is connected with the beam A by passing it around a pulley, G, which is carried by a bracket, H, supported on said beam. This bracket is made capable of adjustment to different-sized plow-beams by means of a manysided eccentric block, I, pivoted to turn in the bracket and arranged to bear down on the beam.

Hinged to opposite sides of the plow-beam A, at a suitable distance from its front or jaw end, within holders k k, are two pointed chain holding or spreading arms, J J. These arms are jagged, or formed with teeth at different points in their length, as shown in Figs. 2 and 3, and serve to engage either by their points or teeth with the chain C on opposite sides of the beam. Said swinging arms not only cause the chain to work with much less friction round the pulley G, but provide for relieving the sulky-plow of side draft by hooking the chain farther out on one side of the plow than on the other, thereby causing more pressure on one side of the beam than on the other. These arms J J may be moved up or down on their pivot-pins in the holders K to conform to different up or down adjustments of the cross-jaws carrying the levers B B', or as other circumstances may require, by means of sleeves l, arranged within their rear ends, and set-screws holding said sleeves on the pivots.

By the use of the cross-jaws D D, and means provided for adjusting independently and laterally therein the levers B B', both of said levers may be moved inwardly or shifted to suit different constructions of sulky-plows, as regards the lateral relation of their poles or tongues, without changing the position of the plow-beam, and preventing the near horse from crowding on the pole or tongue.

By the use of the cross-jaws D D, arranged to extend in front of the plow-beam, ample room is provided for the levers B B' to swing back and forth without striking the wheels of the plow; and said levers may be braced, without restricting such movement of them, by round metal rods M M, hooked at one end to the arm E and at the other end to the under side of the levers, and forming a connection in line with the levers B B', or thereabout.

By using the chain C in place of a cross-bar and rods for connecting the levers B B' with the plow-beam, either an even or uneven pressure of the levers B B' may be obtained at pleasure of the operator. Thus an inward-pressing action of both levers may be produced by leaving both sides of the chain free, or an unequal pressure be obtained by causing either swinging arm J to engage by its point or teeth, at a greater or less distance in its length, with the chain C on one side or the other of the plow-beam, thus causing the plow to take more or less land, as the operator may desire.

Having thus fully described my invention, what I claim as new, and desire to secure by Letters Patent, is—

1. The combination, with the plow-beam A and draft-equalizing levers B B', of the cross-jaws D D and arm E, adjustable up or down on or in said beam, substantially as specified.

2. The combination, with the plow-beam A and draft-equalizing levers B B', of the cross-jaws D D, provided with a series of apertures, h h, for lateral adjustment of the fulcrums g g of said levers relatively to the plow-beam, the arm E, carrying said cross-jaws, adjustable up or down on or within the plow-beam, the chain C, and the pulley G, by which the levers B B' are connected at suitable distances from their fulcrums with the plow-beam, essentially as and for the purposes herein set forth.

3. The swinging toothed or notched arms J J, in combination with the plow-beam A, the draft-equalizing levers B B', the chain C, and the pulley G, substantially as shown and described.

4. The combination, with the plow-beam A, the cross-jaws D D, the arm E, and the draft-equalizing levers B B', of the brace-rods M M, hooked or movably attached to said arm and the levers B B', and arranged in line with said levers, essentially as specified.

DALLAS CARR.

Witnesses:
HENRY GANS,
FRIEDRICH BRAUER.